(12) United States Patent
Masubuchi et al.

(10) Patent No.: US 6,316,068 B1
(45) Date of Patent: Nov. 13, 2001

(54) ELASTOMER COMPOSITION

(75) Inventors: Tetsuo Masubuchi, Kawasaki; Mitsuhiro Tanaka, Yokohama, both of (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/149,996

(22) Filed: Sep. 9, 1998

(30) Foreign Application Priority Data

Sep. 10, 1997 (JP) .................................... 9-245406

(51) Int. Cl.⁷ .......................... B60R 21/24; B29D 22/00; C08L 53/00
(52) U.S. Cl. ........................ 428/35.7; 428/34.1; 524/505; 280/728.1; 280/729
(58) Field of Search .................. 524/505; 428/34.1, 428/35.7; 280/728.1, 729

(56) References Cited

U.S. PATENT DOCUMENTS

| | | | |
|---|---|---|---|
| 5,045,589 | * | 9/1991 | Ueno .................................. 524/505 |
| 5,691,017 | * | 11/1997 | Inaba et al. ......................... 428/35.7 |
| 6,045,152 | * | 4/2000 | Oda .................................. 280/728.3 |

* cited by examiner

*Primary Examiner*—Peter D. Mulcahy
(74) *Attorney, Agent, or Firm*—Pennie & Edmonds LLP

(57) ABSTRACT

An elastomer composition which comprises: (a) 100 parts by weight of a hydrogenated block copolymer prepared by hydrogenating a block copolymer that comprises: a polymer block A mainly comprising at least one vinyl aromatic compound; and a polymer block B mainly comprising at least one conjugate diene, and has a number average molecular weight of from 30,000 to 400,000 and a content of the polymer block A of from 10 to 50% by weight based on the weight of said block copolymer; (b) 5 to 900 parts by weight of a polypropylene mixture comprising: (b-1) 10 to 60% by weight of a polypropylene polymer having a propylene content of 85% by weight or more; and (b-2) 40 to 90% by weight of an ethylene-propylene copolymer rubber having a propylene content of 75% by weight or more, wherein the ethylene-propylene copolymer rubber in said mixture has an average dispersed particle size of not more than 2 μm and said mixture has a bending modulus of from 20 to 700 Mpa, a Shore D hardness of from 20 to 60 and a melt flow rate of from 10 to 60 g/10 minutes; and (c) 0 to 200 parts by weight of a hydrocarbon oil. Also disclosed is a housing cover of air bag apparatus, which comprises the elastomer composition.

13 Claims, 2 Drawing Sheets

ELASTOMER COMPOSITION

FIELD OF THE INVENTION

This invention relates to a thermoplastic elastomer composition which can be used as a raw material of various moldings having excellent anti-flaw property (scratch resistance), flexibility, heat resistance, low temperature characteristics, weather resistance, strength and moldability. Particularly, this invention relates to an elastomer composition which has excellent properties as an air bag apparatus-housing cover designed in such a manner that, when a collision or the like accident happens, the driver or a passenger in an automobile or the like high-speed movable body is protected from secondary collision with the operating unit or with instrument panel by confining the person to the seat.

BACKGROUND OF THE INVENTION

In stead of the formerly used vulcanized rubber as the main material, thermoplastic elastomers are now used frequently in automobile parts, domestic electric components, medical device components and sundry goods because of their excellent productivity. Examples of such cases include olefin elastomers comprising ethylene-propylene copolymer and polypropylene, polyurethane elastomers, soft polyvinyl chloride and the like.

Each of these molding materials, however, has disadvantages in terms of scratch resistance, flexibility, workability, economical efficiency and recycling ability. That is, olefin elastomer is relatively cheap and excellent in terms of weather resistance and heat resistance but is inferior to other materials in flexibility and scratch resistance. Polyurethane elastomer is possessed of excellent scratch resistance but has disadvantages in that it has poor flexibility and weather resistance and is expensive. Also, soft vinyl chloride is relatively cheap and excellent in terms of weather resistance and scratch resistance but has disadvantages in terms of flexibility at low temperature and recycling ability.

In addition, some elastomer compositions have been proposed in which hydrogenated derivatives of a vinyl aromatic compound-conjugate diene compound block copolymer (hereinafter referred to as a "hydrogenated block copolymer") is used. For example, each of JP-A-50-14742, JP-A-52-65551 and JP-A-58-206644 (the term "JP-A" as used herein means an "unexamined published Japanese patent application") discloses a composition in which a hydrogenated block copolymer is blended with a rubber softening agent and an olefin resin. However, these compositions are also poor in scratch resistance similar to the case of olefin elastomers.

On the other hand, the air bag system is principally composed of a collision sensing device which detects collision of a high-speed movable body and an air bag apparatus, and the latter air bag apparatus is composed of an air bag, a gas generator which generates a gas to inflate the air bag, a housing cover which contains the air bag and gas generator and an adapter (retainer) which attaches the gas generator and housing cover. The air bag apparatus is attached to the front side of an occupant in a high-speed movable body, and, when the collision sensing device is activated by a collision, the gas is generated instantaneously from the gas generator and filled in the air bag which is folded and contained in a space formed by the surrounding gas generator, housing cover and retainer, and the housing cover is then unfolded by the pressure of gas filled in the air bag which is immediately released and inflated from the opening created by the unfolding toward the front side of the occupant, so that the occupant is confined to the seat and prevented from injuries by collision with the operating unit or instrument panel. In consequence, when the gas generator is activated by a collision or the like accident, the housing cover of air bag apparatus must release the bag instantaneously through its accurate unfolding without spreading splinters having a danger of injuring the occupant.

As such a housing cover of air bag apparatus, an air bag apparatus-housing cover formed from a urethane resin containing a reinforcing net mainly made of nylon has been proposed in JP-A-50-127336 or JP-A-55-110643.

Since a reinforcing nylon net is used, the just described air bag-housing cover is free from the problem of generating cracking on a part other than the opening portion and causing scattering of a part of the cover when the cover is unfolded, but has other problems such as a prolonged period of time necessary for incorporating the reinforcing net or displacement of the position of the reinforcing net at the time of molding, as well as a disadvantage of being poor in productivity.

Also, JP-A-202550 proposes a housing cover having a structure in which a surface layer made of a soft material having an A hardness according to JIS K6301 of from 30 to 70 and a core layer made of a hard resin having flexibility are integrally molded and a slit for cleavage use is arranged on the core layer. The housing cover of this proposal is desirable in terms that it has a certain degree of rigidity and gives the occupant proper feel, but it has a problem in that it requires two layer molding for the core layer and surface layer so that it requires an expensive double layer molding machine having two sets of injection mechanism. In addition, because of the poor surface anti-flaw ability (scratch resistance) of the surface layer soft material, it is necessary to coat the surface after the double layer molding, thus resulting in high cost.

JP-A-38996 proposes an air bag apparatus-housing cover formed from a thermoplastic elastomer composition mainly comprising a hydrogenated styrene-conjugate diene block copolymer having an A hardness according to JIS K6301 of from 60 to 85. The housing cover of this proposal is desirable in terms that it gives the occupant properly soft feel and adaptability is realized within a broad range of temperature, but it has a problem in that it is necessary to coat the surface after injection molding because of the poor anti-flaw ability (scratch resistance) of the surface, thus resulting in high cost.

SUMMARY OF THE INVENTION

The present invention has been made taking into account the aforementioned problems involved in the conventional techniques.

An object of the present invention is to provide a thermoplastic elastomer composition having improved scratch resistance while keeping flexibility, weather resistance, heat resistance, low temperature characteristics, strength, moldability and the like excellent characteristics of a hydrogenated block copolymer Another object of the present invention is to provide an air bag apparatus-housing cover comprising the elastomer composition, which does not require surface coating and therefore is low in production cost.

Other objects and effects of the present invention will become apparent from the following description.

The above described objects of the present invention have been achieved by providing the following elastomer compositions.

1) An elastomer composition which comprises:
  (a) 100 parts by weight of a hydrogenated block copolymer prepared by hydrogenating a block copolymer that comprises:
    a polymer block A mainly comprising at least one vinyl aromatic compound; and
    a polymer block B mainly comprising at least one conjugate diene,
  and has a number average molecular weight of from 30,000 to 400,000 and a content of the polymer block A of from 10 to 50% by weight based on the weight of said block copolymer;
  (b) 5 to 900 parts by weight of a polypropylene mixture comprising:
    (b-1) 10 to 60% by weight of a polypropylene polymer having a propylene content of 85% by weight or more; and
    (b-2) 40 to 90% by weight of an ethylene-propylene copolymer rubber having a propylene content of 75% by weight or more,
  wherein the ethylene-propylene copolymer rubber in said mixture has an average dispersed particle size of not more than 2 $\mu$m and said mixture has a bending modulus of from 20 to 700 Mpa, a Shore D hardness of from 20 to 60 and a melt flow rate of from 10 to 60 g/10 minutes; and
  (c) 0 to 200 parts by weight of a hydrocarbon oil.

2) An elastomer composition which comprises:
  (a) 100 parts by weight of a mixture of the following hydrogenated block copolymers (a-1) and (a-2):
    (a-1) 10 to 70 parts by weight of a hydrogenated block copolymer prepared by hydrogenating a block copolymer that comprises:
      a polymer block A' mainly comprising at least two vinyl aromatic compounds; and
      a polymer block B mainly comprising at least one conjugate diene,
    and has a number average molecular weight of from 150,000 to 400,000 and a content of the polymer block A' of from 15 to 50% by weight based on the weight of the copolymer; and
    (a-2) 30 to 90 parts by weight of a hydrogenated block copolymer prepared by hydrogenating a block copolymer that comprises:
      a polymer block A mainly comprising at least one vinyl aromatic compound; and
      a polymer block B mainly comprising at least one conjugate diene,
    and has a number average molecular weight of from 30,000 to 140,000 and a content of the polymer block A of from 10 to 50% by weight based on the weight of the copolymer;
  (b) 5 to 900 parts by weight of a polypropylene mixture comprising:
    (b-1) 10 to 60% by weight of a polypropylene polymer having a propylene content of 85% by weight or more; and
    (b-2) 40 to 90% by weight of an ethylene-propylene copolymer rubber having a propylene content of 75% by weight or more,
  wherein 70% by weight or more of the ethylene-propylene copolymer rubber in said mixture has an average dispersed particle size of 2 $\mu$m or less and said mixture has a bending modulus of from 20 to 700 Mpa, a Shore D hardness of from 20 to 60 and a melt flow rate of from 10 to 60 g/10 minutes;
  (c) 0 to 200 parts by weight of a hydrocarbon oil; and
  (d) 20 to 150 parts by weight of a polyolefin resin having a melt flow rate of from 5 to 100 g/10 minutes.

3) The elastomer composition according to the above 1) or 2), wherein the polypropylene composition (b) has a melt flow rate of from 12 to 60 g/10 minutes.

4) The elastomer composition according to the above 1) or 2), wherein the polypropylene composition (b) is a mixture prepared by a successive polymerization having at least two steps which comprises:
  a first step of preparing a propylene homopolymer, a propylene-$\alpha$-olefin copolymer having a propylene content of not less than 85% by weight, or an ethylene-propylene copolymer having a propylene content of not less than 85% by weight; and
  a second step of preparing an ethylene-propylene or ethylene-propylene-$\alpha$-olefin copolymer optionally containing a small amount of diene.

5) The elastomer composition according to the above 1) or 2), wherein the vinyl aromatic compound is styrene and the conjugate diene compound is butadiene, isoprene or a combination thereof.

6) The elastomer composition according to the above 1) or 2), wherein the hydrocarbon oil is a non-aromatic mineral oil.

7) The elastomer composition according to the above 1) or 2), wherein the amount of the hydrocarbon oil is 10 to 100 parts by weight.

8) The elastomer composition according to the above 2), wherein the polyolefin resin comprises at least one of a propylene homopolymer and a copolymer of propylene with an $\alpha$-olefin having from 2 to 8 carbon atoms.

The invention also relates to a housing cover of air bag apparatus, which comprises the elastomer composition of the above 1) or 2).

DETAILED DESCRIPTION OF THE INVENTION

Figure 1:
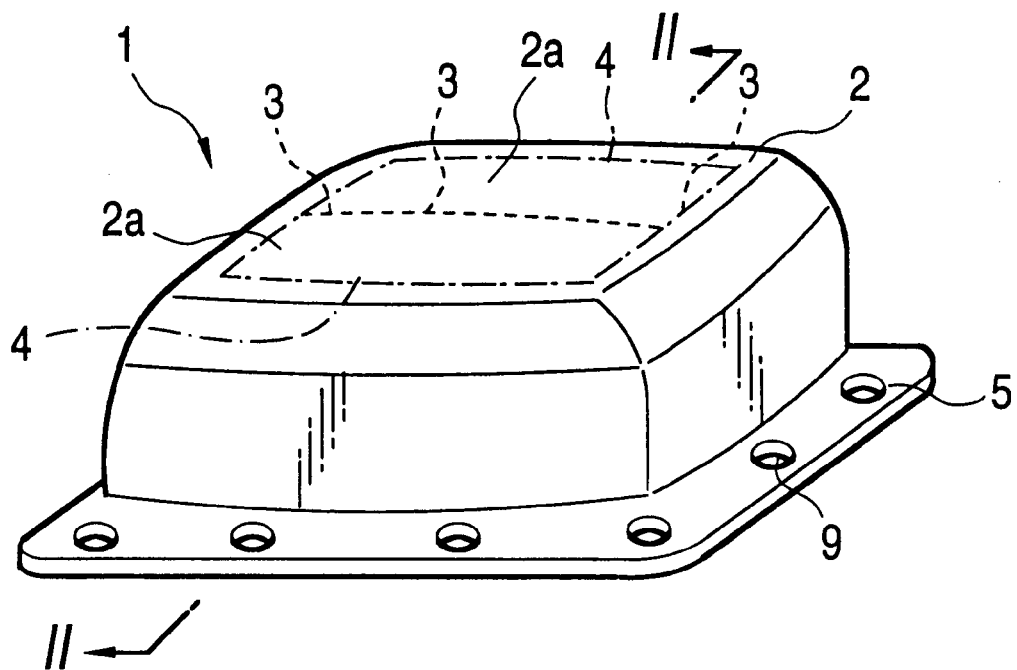
FIG. 1 is a perspective diagram showing an example of the air bag apparatus-housing cover for driver's seat according to the present invention.

The present invention is described in detail below.

The vinyl aromatic compound which constitutes the component (a), hydrogenated block copolymer, for use in the present invention may be one or two or more selected, for example, from styrene, $\alpha$-methylstyrene, vinyltoluene, p-tert-butylstyrene and the like, of which styrene is preferred. The content of the polymer block A mainly comprising the vinyl aromatic compound in the hydrogenated block copolymer is from 10 to 50% by weight, preferably from 15 to 40% by weight, based on the weight of the hydrogenated block copolymer.

As the conjugate diene compound, one or two or more compounds may be selected, for example, from butadiene, isoprene, 1,3-pentadiene, 2,3-dimethyl-1,3-butadiene and the like, of which butadiene, isoprene or a combination thereof is preferred. With regard to the polymer block B mainly comprising the conjugate diene compound prior to hydrogenation, microstructure of the block can be optionally selected. For example, a polybutadiene block may have a 1,2-vinyl bond structure in an amount of from 20 to 50% by weight, preferably from 25 to 45% by weight, and a polyisoprene block may have a 1,4-vinyl bond in an amount of 80% by weight or more, preferably 90% by weight or more.

The hydrogenated block copolymer for use in the present invention has a number average molecular weight of from 30,000 to 400,000, preferably from 50,000 to 350,000, more preferably from 60,000 to 300,000. If the number average molecular weights of the hydrogenated block copolymer is less than 30,000, the strength and heat resistance of the resulting elastomer composition are undesirably deteriorated. On the other hand, if the number average molecular weight of the hydrogenated block copolymer is more than 400,000, the moldability (fluidity) of the elastomer composition is undesirably reduced, and the appearance of the molded product (generation of flow marks) is deteriorated.

In order to use the elastomer composition as an air bag-housing cover having particularly excellent moldability, strength, high temperature characteristics and low temperature characteristics, two types of the hydrogenated block copolymer, (a-1) and (a-2), are used. The hydrogenated block copolymer (a-1) has a number average molecular weight of from 150,000 to 400,000, preferably from 180,000 to 350,000, more preferably from 200,000 to 300,000. The polymer block A' occupies from 15 to 50% by weight, preferably from 20 to 35% by weight, of the copolymer. If the number average molecular weight of the hydrogenated block copolymer is less than 150,000, the strength and heat resistance of the resulting elastomer composition are undesirably reduced. On the other hand, if the number average molecular weight of the hydrogenated block copolymer is more than 400,000, the moldability (fluidity) of the elastomer composition is undesirably reduced, and the appearance of the molded product (generation of flow marks) is deteriorated. Also, if the content of the polymer block A' in the copolymer is less than 15% by weight, the strength and heat resistance of the resulting elastomer composition are undesirably reduced. On the other hand, if the content of the polymer block A' in the copolymer is more than 50% by weight, the scratch resistance and flexibility of the elastomer composition as well as the moldability and low temperature characteristics are undesirably reduced.

The hydrogenated block copolymer (a-2) has a number average molecular weight of from 30,000 to 140,000, preferably from 50,000 to 120,000, more preferably from 60,000 to 90,000, and the polymer block A occupies from 10 to 50% by weight, preferably from 13 to 30% by weight, more preferably from 15 to 25% by weight, of the copolymer. If the number average molecular weight of the hydrogenated block copolymer is less than 30,000, the strength and heat resistance of the resulting elastomer composition are undesirably reduced. On the other hand, if the number average molecular weight of the hydrogenated block copolymer is more than 140,000, the moldability (fluidity) of the elastomer composition is undesirably reduced and the appearance of the molded product (generation of flow marks) is deteriorated. Also, the content of the polymer block A in the copolymer is less than 10% by weight, the strength and heat resistance of the resulting elastomer composition are undesirably reduced. On the other hand, if the content of the polymer block A in the copolymer is more than 50% by weight, the scratch resistance and flexibility of the elastomer composition are undesirably reduced.

The hydrogenated block copolymer generally has a molecular weight distribution (ratio of weight average molecular weight (Mw) to number average molecular weight (Mn), (Mw/Mn)) of 5 or less, preferably 2 or less, more preferably 1.5 or less. If the molecular weight distribution is larger than 5, it may undesirably result in insufficient strength and heat resistance of the elastomer composition.

The molecular weight and molecular weight distribution as used herein can be measured for example by a GPC (gel permeation chromatography) method. In the GPC analysis, the molecular weight can be calculated using a calibration curve prepared from standard polystyrene.

The hydrogenated block copolymer for use in the present invention is a block copolymer prepared by hydrogenating a block copolymer which comprises a polymer block A mainly comprising at least one vinyl aromatic compound and a polymer block B mainly comprising at least one conjugate diene. Examples of its structure include A—B, A—B—A, B—A—B—A, A—B—A—B—A, B—A—B—A—B, (A—B)$_4$—Si, (B—A—B)$_4$—Si, (A—B)$_3$—Si—R, (A—B)$_2$—Si(R)R' and the like (wherein R and R' may be the same or different from each other and each represents a $C_1$–$C_8$ alkyl group, an alkoxyl group or a halogen residue).

In order to obtain excellent moldability, strength, high temperature characteristics and low temperature characteristics, two components (a-1) and (a-2) are used, and the hydrogenated block copolymer to be used as the (a-1) component is a block copolymer prepared by hydrogenating a block copolymer which comprises a polymer block A' mainly comprising at least two vinyl aromatic compounds and a polymer block B mainly comprising at least one conjugate diene. Examples of its structure include A'—B—A', B—A'—B—A', A'—B—A'—B—A', B—A'—B—A'—B and the like.

Also, the hydrogenated block copolymer to be used as the (a-2) component is a block copolymer prepared by hydrogenating a block copolymer which comprises a polymer block A mainly comprising at least one vinyl aromatic compound and a polymer block B mainly comprising at least one conjugate diene. Examples of its structure include A—B, A—B—A, B—A—B—A, A—B—A—B—A, B—A—B—A—B and the like.

With regard to the polymer block A mainly comprising a vinyl aromatic compound, and the polymer block B mainly comprising a conjugate diene, of the hydrogenated block copolymer to be used as the component (a) for use in the present invention, the distribution of the vinyl aromatic compound or of conjugate diene compound in respective polymer block may be random or tapered (monomer component increases or decreases along the molecular chain) or in a partially blocked form, or an arbitrary combination thereof. Further, two or more units of the polymer block A and polymer block B are present, these units of each polymer block may have the same or different structures.

With regard to the blending ratio of the hydrogenated block copolymer (a-1) and the hydrogenated block copolymer (a-2), the block copolymer (a-1) is used in an amount of from 10 to 70 parts by weight and the block copolymer (a-2) is used from 30 to 90 parts by weight, preferably, the block copolymer (a-1) is used in an amount of from 15 to 60 parts by weight and the block copolymer (a-2) is used from 40 to 85 parts by weight, more preferably, the block copolymer (a-1) is used in an amount of from 20 to 50 parts by weight and the block copolymer (a-2) is used from 50 to 80 parts by weight, based on 100 parts by weight of the total hydrogenated block copolymer. If the amount of the block copolymer (a-1) is less than 10 parts by weight, the strength and heat resistance of the resulting elastomer composition are undesirably reduced. On the other hand, if the amount of the block copolymer (a-1) is more than 70 parts by weight, the moldability (fluidity) of the elastomer composition is undesirably reduced and the appearance of the molded product (generation of flow marks) is deteriorated.

The method for the production of these block copolymers is not particularly limited as long as the product has the aforementioned structure, and a vinyl aromatic compound-conjugate diene compound block copolymer before the hydrogenation can, for example, be synthesized in an inert solvent in the presence of a lithium catalyst in accordance with the method described in JP-B-40-23798 (the term "JP-B" as used herein means an "examined Japanese patent publication").

Examples of the hydrogenation method include those described in JP-B-42-8704, JP-B-43-6636, JP-A-60-220147, JP-A-61-33132 and JP-A-62-207303. The reaction conditions are selected such that at least 80%, preferably 90% or more, of the aliphatic double bond of the conjugate diene compound is hydrogenated, while 20% or less, preferably 10% or less, of the vinyl aromatic compound is hydrogenated. The hydrogenation ratio of the hydrogenated block copolymer can be readily known by an infrared spectral analysis or a nuclear magnetic resonance analysis.

Unlike the case of a conventional mixture of polypropylene with EP rubber and the like prepared by an extruder or a brabender, the polypropylene mixture as the component (b) for use in the present invention is a plastoelastic polyolefin elastomer and the mixture is formed simultaneously with the polymerization in a reaction vessel. Since the formed rubber phase is finely and uniformly distributed in the polypropylene matrix, this mixture has excellent scratch resistance in comparison with the conventional mixture prepared by blending. In consequence, when added to the thermoplastic elastomer composition of the present invention, this mixture takes a role of improving its moldability and appearance of the molded product (flow marks) without spoiling its scratch resistance and flexibility.

The polypropylene mixture as the component (b) for use in the present invention is a propylene copolymer mixture obtained by at least two steps of successive polymerization. A component (b-1) is formed in the first step by conducting a polymerization of a propylene homopolymer, a propylene-α-olefin copolymer having a propylene content of not less than 85% by weight, or an ethylene-propylene copolymer having a propylene content of not less than 85% by weight, and then a component (b-2) is formed in a subsequent step by conducting a polymerization of an ethylene-propylene having a propylene content of not less than 75% by weight, or an ethylene propylene-α-olefin copolymer which has a propylene content of not less than 75% by weight and which may contain a small amount of diene.

The first step polymerization of propylene can be carried out in the presence of ethylene or α-olefin, such as butene-1, pentene-1, 4-methyl-pentene-1, hexene-1, octene-1 or a combination thereof, in such an amount that the obtained polypropylene has an isotactic index of 80% or more, preferably 85% or more, more preferably 90% or more.

The monomers to be used for the polymerization of an ethylene-propylene copolymer or an ethylene-propylene-α-olefin copolymer in the second or a subsequent step are propylene and ethylene and/or α-olefin (for example, butene-1, pentene-1, 4-methyl-pentene-1, hexene-1, octene-1 or a combination thereof). The polymerization of the copolymer in the second or subsequent step can be carried out in the presence of a conjugate or non-conjugate diene, such as butadiene, 1,4-hexadiene, 1,5-hexadiene or ethylidenenorbornane-1. When a diene is present, its amount is typically from 0.5 to 10% by weight based on the weight of total monomers used in the second or subsequent step.

The content of (b-1) in the polypropylene composition of component (b) is within the range of from 10 to 60% by weight, preferably from 15 to 50% by weight, and the content of (b-2) is within the range of from 40 to 90% by weight, preferably from 50 to 85% by weight.

The total amount of ethylene copolymerized in the polypropylene mixture of component (b) is generally within the range of from 15 to 60% by weight, preferably from 17 to 45% by weight, more preferably from 20 to 35% by weight. The total amount of α-olefin copolymerized in the polypropylene mixture of component (b) is generally within the range of from 0 to 30% by weight, preferably from 3 to 20% by weight, more preferably from 5 to 10% by weight.

When measured by a differential scanning calorimetry (DSC), the mixture (b) shows at least one melting peak at a temperature higher than 120° C., preferably at a temperature higher than 140° C. In addition, the mixture (b) has a bending modulus of from 20 to 700 Mpa, preferably from 50 to 300 Mpa, more preferably from 70 to 200 Mpa. Further, the mixture (b) has a Shore D hardness of from 20 to 60, preferably from 30 to 50.

In addition, the mixture (b) has a melt flow rate (a value measured at 230° C. under a load of 2.16 kg in accordance with the procedure of ASTM D1238; hereinafter referred to as "MFR") of from 10 to 60 g/10 minutes, preferably from 12 to 60 g/10 minutes, more preferably from 12 to 50 g/10 minutes, and particularly preferably from 15 to 40 g/10 minutes. MFR values less than 10 g/10 minutes are not preferred because the melt viscosity of the elastomer composition becomes high, the moldability (fluidity) of the elastomer composition is reduced, and the appearance of the molded product (generation of flow marks) is deteriorated. In addition, MFR values less than 10 g/10 minutes cause reduction of scratch resistance of the elastomer composition, and therefore are not preferred. On the other hand, MFR values more than 60 g/10 minutes are also not preferred, because reduced strength and heat resistance of the resulting elastomer composition are caused.

The ethylene-propylene copolymer rubber to be dispersed in the mixture (b) has an average dispersed particle size of 2 μm or less, preferably 1.5 μm or less. If the average dispersed particle size of the rubber is larger than 2 μm, the scratch resistance of the resulting elastomer composition is extremely reduced.

The catalyst to be used in the polymerization of the polypropylene mixture of component (b) is a Ziegler-Natta type catalyst. Preferred catalyst is a reaction product of a solid catalyst component containing a titanium compound supported on magnesium chloride and an electron donor compound (internal donor) with a trialkyl aluminum compound and an electron donor compound (external donor). Methods for the preparation of such a catalyst and polymerization of the component (b) are described for example in JP-A-3-205439, JP-A-6-25367 and JP-A-6-25489.

The blending amount of the polypropylene mixture of component (b) in the thermoplastic elastomer composition of the present invention is within the range of from 5 to 900 parts by weight, preferably from 10 to 500 parts by weight, more preferably from 15 to 200 parts by weight, based on 100 parts by weight of the hydrogenated block copolymer (a). Blending amounts of the polypropylene mixture of component (b) larger than 900 parts by weight result in the reduction of rubber elasticity and henceare not preferred. In addition, when used in a housing cover of air bag apparatus, blending amounts of the polypropylene mixture of component (b) larger than 200 parts by weight deteriorate unfolding ability of the air bag at a low temperature and hence are not preferred. Blending amounts of the polypropylene mixture of component (b) less than 5 parts by weight undesirably cause deteriorated appearance (generation of flow marks) of formed product of the thermoplastic elastomer composition. When used in a housing cover of air bag apparatus, more preferred blending amount of the component (b) is within the range of from 15 to 100 parts by weight.

In this connection, the polypropylene mixture of component (b) to be used in the present invention can be obtained commercially under trade names of Adflex, Hifax (Catalloy TPO Series, manufactured by Montell) and the like.

The component (c) for use in the present invention is a hydrocarbon oil which has an effect to improve flexibility and workability of the obtained composition, and a non-aromatic mineral oil or a liquid or low molecular weight synthetic softening agent is suitable. As the non-aromatic mineral oil, generally known paraffin oils and naphthene oils can be used, and a paraffin oil containing 10% by weight or less of aromatic ring components is particularly desirable.

The blending amount of the hydrocarbon oil is within the range of from 0 to 200 parts by weight, preferably from 0 to 100 parts by weight, more preferably from 5 to 100 parts by weight, further preferably from 10 to 100 parts by weight, particularly preferably from 10 to 60 parts by weight, based on 100 parts by weight of the hydrogenated block copolymer. Blending amounts of the hydrocarbon oil more than 200 parts by weight undesirably result in the reduction of scratch resistance and heat resistance of the elastomer composition.

The component (d) for use in the present invention is a polyolefin resin such as a polyethylene resin or a polypropylene resin. Examples of the polyethylene resin include a low density polyethylene, a linear low density polyethylene, a high density polyethylene and a copolymer of ethylene with an α-olefin having 3 to 8 carbon atoms. In the case of the copolymer of ethylene with an α-olefin having 3 to 8 carbon atoms, examples of the α-olefin include propylene, butene-1, isobutene, pentene-1, hexene-1, 4-methylpentene-1, octene-1 and the like. Such a copolymer may contain 30% by weight or less of the α-olefin.

Examples of the polypropylene resin include a propylene homopolymer and a copolymer of propylene with an α-olefin having 2 to 8 carbon atoms (hereinafter referred to as a "propylene resin"). In the case of the copolymer of propylene with an α-olefin having 2 to 8 carbon atoms, examples of the α-olefin include ethylene, butene-1, isobutene, pentene-1, hexene-1, 4-methylpentene-1, octene-1 and the like. Such a copolymer may contain 30% by weight or less of the α-olefin. These propylene resins can be synthesized by a generally known method, such as a propylene homopolymer and a random or block copolymer of propylene with an α-olefin synthesized by the use of a Zieglar-Natta type catalyst. In order to obtain an elastomer composition having excellent heat resistance and moldability, it is desirable to use a polypropylene resin as the polyolefin resin.

These polyolefin resins may have an MFR value of from 5 to 100 g/10 minutes, preferably from 10 to 60 g/10 minutes. MFR values less than 5 g/10 minutes are not preferred because they cause high melt viscosity of the elastomer composition, reduced moldability (fluidity) of the elastomer composition and deteriorated appearance (generation of flow marks) of the formed product. MFR values more than 100 g/10 minutes are also not preferred, because the strength and heat resistance of the elastomer composition are reduced.

The component (d) polyolefin resin for use in the present invention has effects to control hardness and improve workability of the thermoplastic elastomer composition, and its blending amount is within the range of preferably from 20 to 150 parts by weight, more preferably from 50 to 110 parts by weight, based on 100 parts by weight of the hydrogenated block copolymer. Blending amounts of the polyolefin resin smaller than 20 parts by weight are not preferred because they cause reduced heat resistance and moldability (fluidity) of the elastomer composition and deteriorated appearance (generation of flow marks) of the formed product. On the other hand, blending amounts of the polyolefin resin larger than 150 parts by weight are also not preferred because the flexibility of the elastomer composition is reduced.

If desired, the composition of the present invention may contain an inorganic filler, a stabilizing agent, a lubricating agent, a coloring agent, silicon oil, a fire retarding material and the like additives. Examples of the inorganic filler include calcium carbonate, talc, magnesium hydroxide, mica, barium sulfate, silicic acid (white carbon), titanium oxide, carbon black and the like. Examples of the stabilizing agent include a hindered phenol based antioxidant, a phosphate based heat stabilizer, a hindered amine based light stabilizer, a benzotriazole based UV absorbent and the like. Examples of the lubricating agent include stearic acid, a stearic ester, a stearic acid metal salt and the like.

With regard to the production method of the elastomer composition of the present invention, any known conventional method may be used for the blending of polymer components. In order to obtain most uniform blend, it is desirable to carry out melt kneading using a mixing roller, a kneader, a Banbury mixer, an extruder and the like various kneading machines. A uniform elastomer composition can be obtained by dry blending these components in advance using a Henschel mixer, a tumbler, a ribbon mixer or the like mixing machine and then subjecting the mixture to melt kneading.

With regard to the method for molding the elastomer composition of the present invention, injection molding, extrusion molding, compression molding and the like can be applicable, and the inventive elastomer composition has a characteristic nature in that it shows excellent moldability at the time of injection molding. When injection molding is carried out, an injection-molded product can be obtained within a short period of time by the use of a usual plastic molding machine. Also, since the elastomer composition of the present invention has excellent thermal stability, it has an advantage in that the spool part and runner part can be recycled.

In addition, injection molding can be suitably used as a method for further molding the thus obtained composition into a housing cover of air bag apparatus. A housing cover of air bag apparatus can be obtained within a short period of time by introducing the composition into an injection molding machine equipped with a mold of the housing cover of air bag apparatus and then carrying out injection molding. Also, since the elastomer composition of the present invention has excellent thermal stability, it has an advantage in that the spool part and runner part can be recycled.

In order to ensure that the housing cover of air bag apparatus is unfolded and the air bag is instantaneous released, it is desirable to arrange a tear line designed in advance on the cover. The tear line is designed in an H shape, a U shape or the like, by taking into account the position of a passenger, the position of the air bag apparatus to be arranged, the releasing direction of the air bag, the shape of the cover, etc. Also, the tear line can be made into a V shape, U shape or the like groove by reducing thickness of the line along the portion to be cleaved.

Although it is economically advantageous to carry out monolayer molding of the air bag cover of the present invention by injection molding, it may be used as a composite layer with other plastic material for the purpose of reinforcing its attaching part and improving rigidity of the molded product. When a composite cover is molded, a double layer injection molding or an adhesive-aided method can be employed, and the elastomer composition of the present invention can be used suitably as a surface covering material because of its excellent anti-flaw ability.

The present invention will be described in detail with reference to the following Examples, but the invention should not be construed as being limited thereto.

Test methods used for the evaluation of various properties in the Examples and comparative Examples shown below are as follows.

(1) Hardness

Measured in accordance-with JIS K6253, A type, at 23° C.

(2) Tensile strength (kgf/cm$^2$)

Measured in accordance with JIS K6251, No. 3 dumbbell. A press sheet of 2 mm in thickness was used as a sample.

(3) Elongation (%)

Measured in accordance with JIS K6251, No. 3 dumbbell. A press sheet of 2 mm in thickness was used as a sample.

(4) Resilience (%)

Measured in accordance with JIS K6255, Lüpke pendulum, at 23° C.

(5) Heat Sag (mm)

A test piece of 110 mm in length, 12.5 mm in width and 2 mm in thickness was formed using an injection molding machine. The test piece was allowed to stand for 24 hours or more in an atmosphere of 23° C. and 50% relative humidity. A square iron column of 80 mm in height was placed on a horizontal iron plate, and one side of the test piece was fixed on the upper surface of the square iron column in such a manner that 80 mm portion of the test piece was overhung (the fixed part was horizontally set). The thus prepared sample was allowed to stand for one hour in an oven controlled at 110° C. in advance-and then took out. The height between the tip part of the sample opposite to the fixed part and the horizontal iron plate was measured before and after its treatment in the oven, and the difference was shown as the result.

(6) Melt Flow Rate (MFR) (g/10 Minutes)

Measured in accordance with ASTM D1238, at 230° C. under a load of 2.16 kg.

(7) Flaw Resistance and Gloss Retention (%)

A plate having smooth surface was formed by injection molding. The plate was horizontally arranged, and a cotton cloth to which a load of 40 g/cm$^2$ was applied was put on the plate and reciprocated 200 times. The degree of gloss of the rubbed surface was measured in accordance with the procedure of JIS K7105 (E1), and the gloss retention, (E1/E0)× 100 (%), from the degree of gloss before the rubbing (E0) was calculated.

(8) De-embossing Test

A plate having a surface emboss (satin finished surface, about 20 μm in edging depth) was formed by injection molding. The plate was allowed to stand for 168 hours in an oven of 100° C. After putting out from the oven, conditions of its surface were observed with the naked eye, and the result was marked with "○" when no changes were found, "Δ" when a slight gloss was found, or "X" when gloss was found.

(9) Moldability

An air bag apparatus-housing cover for driver's seat use, having a thickness of 4 mm, a breaking-planed part (tear line) thickness of 0.5 mm and a hinge part thickness of 2.5 mm, was formed using an injection molding machine under the following conditions. Flow mark, gloss and the like appearances of the thus formed body were observed with the naked eye, and the result was marked with "○" when good, "Δ" when slightly bad, or "X" when bad.

Cylinder temperature:
C1: 200° C.
C2: 210° C.
C3: 210° C.

Nozzle temperature: 200° C.

Injection speed: low speed

Mold temperature: 40° C.

(10) Unfolding Performance of Housing Cover

An air bag apparatus was assembled by attaching an air bag and a housing cover to an adapter (retainer) made of iron and further attaching a gas generator thereto. Next, the thus assembled air bag apparatus was put into an oven controlled at an unfolding temperature (−40° C., 23° C. or 90° C.), allowed, after the inner temperature became stable, to stand for 1 hour, put out from the oven, attached to a stand and then energized to unfold it (energized within 1 minute after putting out it from the oven). The unfolding was judged good when the housing cover was broken at the breaking-planned part without generating broken fragments and the air bag was unfolded smoothly.

Each of the components used in the inventive and comparative examples was synthesized in the following manner.

Component (a-1)-1

A hydrogenated block copolymer of a styrene/butadiene block copolymer having a structure of A—B—A, a number average molecular weight of 220,000, a molecular weight distribution of 1.2, a bonded styrene content of 30% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-1)-2

A hydrogenated block copolymer of a styrene/butadiene block copolymer having a structure of A—B—A, a number average molecular weight of 270,000, a molecular weight distribution of 1.1, a bonded styrene content of 33% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-1)-3

A hydrogenated block copolymer of a styrene/isoprene block copolymer having a structure of A—B—A, a number average molecular weight of 290,000, a molecular weight distribution of 1.2, a bonded styrene content of 28% by weight, a 1,4-bond content in the polyisoprene moiety prior to the hydrogenation of 94% by weight and a 3,4-bond content in the polyisoprene moiety prior to the hydrogenation of 6%, and a hydrogenation ratio in the polyisoprene moiety of 99% was synthesized in accordance with the method described in JP-A-60-220147.

Component (a-1)-4

A hydrogenated block copolymer of a styrene/butadiene block copolymer having a structure of B—A—B—A, a number average molecular weight of 210,000, a molecular weight distribution of 1.2, a bonded styrene content of 35% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-1)-5

A hydrogenated block copolymer of a styrene/butadiene block copolymer having a structure of A—B—A, a number average molecular weight of 250,000, a molecular weight distribution of 1.2, a bonded styrene content of 55% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Component (a-2)-1

A hydrogenated block copolymer of a styrene/butadiene block copolymer having a structure of A—B—A, a number average molecular weight of 90,000, a molecular weight distribution of 1.10, a bonded styrene content of 18% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-2)-2

A hydrogenated block copolymer of a styrene/butadiene block copolymer having a structure of B—A—B—A, a number average molecular weight of 65,000, a molecular weight distribution of 1.13, a bonded styrene content of 23% by weight, a 1,2-vinyl content in the polybutadiene moiety prior to the hydrogenation of 36% by weight and a hydrogenation ratio in the polybutadiene moiety of 99% was synthesized in accordance with the method described in JP-A-60-220147.

Component (a-2)-3

A hydrogenated block copolymer of a styrene/isoprene block copolymer having a structure of A—B—A, a number average molecular weight of 55,000, a molecular weight distribution of 1.1, a bonded styrene content of 25% by weight, a 1,4-bond content in the polyisoprene moiety prior to the hydrogenation of 94% by weight, a 3,4-bond content in the polyisoprene moiety prior to the hydrogenation of 6% by weight and a hydrogenation ratio in the polyisoprene moiety of 99% was synthesized in accordance with the method described in JP-A-60-220147.

Component (a-2)-4

A hydrogenated block copolymer of a styrene/butadiene block copolymer having a structure of A—B—A, a number average molecular weight of 25,000, a molecular weight distribution of 1.14, a bonded styrene content of 21% by weight, a 1,2-vinyl bond content in the polybutadiene moiety prior to the hydrogenation of 38% by weight and a hydrogenation ratio in the polybutadiene moiety of 99% was synthesized in accordance with the method described in JP-A-60-220147.

Component (a-2)-5

A hydrogenated block copolymer of a styrene/butadiene block copolymer having a structure of B—A—B—A, a number average molecular weight of 70,000, a molecular weight distribution of 1.1, a bonded styrene content of 55% by weight, a 1,2-vinyl bond content in the polybutadiene moiety prior to the hydrogenation of 36% by weight and a hydrogenation ratio in the polybutadiene moiety of 99% was synthesized in accordance with the method described in JP-A-60-220147.

Preparation of Solid Catalyst

A mixture consisting of 49.5 g of anhydrous $MgCl_2$ and anhydrous ethanol, 100 ml of vaseline oil and 100 ml of silicon oil was stirred at 120° C. in an atmosphere of nitrogen until $MgCl_2$ was completely dissolved. Next, the thus prepared mixture was transferred into a 1,500 ml capacity autoclave charged in advance with 150 ml of vaseline oil and 150 ml of silicon oil and then stirred at 3,000 rpm for 3 minutes at 120° C. This mixture was added to 1,000 ml of cooled n-heptane which was stirred, thereby effecting precipitation of $MgCl_2.3EtOH$ in the form of spherical solid (average particle size, 30 to 150 μm). Thereafter, the thus obtained solid was dried while increasing the temperature from 50° C. to 100° C., thereby adjusting the $EtOH/MgCl_2$ molar ratio to 1.27. The thus obtained solid was found to have a porosity of 0.139 cc/g, a surface area of 9.1 $m^2/g$ and a bulk density of 0.564 g/cc.

A 25 g portion of this solid (carrier) was added to an autoclave equipped with a stirrer, which has been charged with 625 cc of $TiCl_4$ in advance, at 0° C. in an atmosphere of nitrogen. The autoclave was heated to 100° C. spending 1 hour. When the temperature became 40° C. during the temperature rising, diisobutyl phthalate was added at a molar ratio of 1/8 based on magnesium. After 2 hours of stirring at 100° C., the mixture was allowed to stand at the same temperature to effect precipitation of the solid. The supernatant fluid was removed by sucking it with a siphon. A 550 ml portion of $TiCl_4$ was again added, and the mixture was stirred at 120° C. for 1 hour and then allowed to stand. After removing the supernatant fluid by sucking it with a siphon, the remaining solid was washed with 200 ml of anhydrous hexane six times at 60° C. and three times at room temperature. This was dried under vacuum and used as a catalyst for the polymerization of compound (b).

Component (b)-1 and component (b)-2 were polymerized in the following manner. The polymerization was continuously carried out in a series of reaction vessels equipped with an apparatus which transferred the reaction mixtures from one reaction vessel to other reaction vessel in succession. At 20° C., a 22-liter capacity autoclave equipped with an agitator was charged with 16 liters of liquid propylene and a polymerization catalyst (Al/CMMS molar ratio, 7.5) composed of a mixture of 75 ml hexane solution of about 0.15 g of the aforementioned solid catalyst and 10% triethylaluminum with cyclohexylmethyldimethoxysilane (CMMS), and a polymerization was carried out for 24 minutes at 20° C. The thus obtained prepolymer was transferred to the first reaction vessel in a gas phase where homopolymerization of propylene was carried out. The thus obtained polymer was then transferred to the second reaction vessel to carry out copolymerization of ethylene and propylene. Polymerization conditions in the first and second reaction vessels and properties of the thus obtained final products are shown in Table 1.

TABLE 1

|  | Component (b)-1 | Component (b)-2 |
| --- | --- | --- |
| First reaction vessel |  |  |
| Temperature (° C.) | 70 | 70 |
| Pressure (atm) | 30 | 30 |
| Polymerization time (minute) | 30 | 30 |
| Hydrogen in the gas phase (mol %) | 6 | 2 |
| Isotactic index (% by weight) | 95.5 | 95.4 |

TABLE 1-continued

|  | Component (b)-1 | Component (b)-2 |
| --- | --- | --- |
| Second reaction vessel |  |  |
| Temperature (° C.) | 50 | 50 |
| Pressure (atm) | 14 | 14 |
| Time (minute) | 250 | 250 |
| Hydrogen in the gas phase (mol %) | 7 | 4 |
| Ethylene in the gas phase (mol %) | 19.5 | 23.5 |
| Final product |  |  |
| Yield (kg polymer/g catalyst) | 7.5 | 8.3 |
| Ethylene content (% by weight) | 22.5 | 30.1 |
| Homopolypropylene content (% by weight) | 43.0 | 28.5 |
| Melting point (° C.) | 164 | 163 |
| Bending modulus (MPa) | 103 | 83 |
| Shore D hardness | 43 | 40 |
| MFR (g/10 minutes) | 32 | 12 |
| Average dispersed particle size of rubber μm) | 0.4 | 0.5 |

Component (b)-3

Catalloy Adflex KS-084P manufactured by Montell (MFR, 30 g/10 minutes; bending modulus, 108 MPa; Shore D hardness, 44; average dispersed particle size of rubber, 0.4 μm).

Component (b)-4

Catalloy Adflex KS-359P manufactured by Montell (MFR, 12 g/10 minutes; bending modulus, 83 MPa; Shore D hardness, 41; average dispersed particle size of rubber, 0.6 μm).

Component (b)-5

Catalloy Adflex KS-221P manufactured by Montell (MFR, 2.5 g/10 minutes; bending modulus, 350 MPa; Shore D hardness, 53; average dispersed particle size of rubber, 0.5 μm).

Component (c)

Diana Process Oil PW-380, a paraffin oil manufactured by Idemitsu (dynamic viscosity, 380 cSt).

Component (d)-1

Show Aromer MK511 (block type polypropylene) manufactured by JPO (MFR, 15 g/10 minutes; bending modulus, 1400 MPa).

Component (d)-2

Show Aromer M1700 (homopolypropylene) manufactured by JPO (MFR, 31 g/10 minutes; bending modulus, 1450 MPa).

EXAMPLES 1 TO 4

Using (a-2)-1 or (a-1)-4 as a hydrogenated block copolymer, (b)-1 as a polypropylene mixture and (c) as a hydrocarbon oil, these compounds in respective amounts shown in Table 2 were blended using Henschel mixer and then melt-kneaded at 220° C. using an equi-directional twin screw extruder of 45 mm in diameter to obtain pellets of respective elastomer compositions. The results of the examination of their physical properties and moldability are shown in Table 2.

Comparative Examples 1 To 4

Using (a-2)-1 or (a-1)-4 as a hydrogenated block copolymer, (b)-1 or, for comparison, an extrusion blend type TPO (PP/EPDM blend) Santoprene 203-40 (bending modulus, 80 MPa; Shore D hardness, 40; MFR, 8 g/10 minutes; dispersed particle size of rubber, 9 μm) as a polypropylene mixture, and (c) as a hydrocarbon oil, these compounds in respective amounts shown in Table 3 were melt-kneaded and evaluated in the same manner as described in Examples 1 to 4. The results are shown in Table 3. It is evident from these results that each composition outside the range of the present invention is poor in some of the physical properties.

TABLE 2

|  | Example 1 | Example 2 | Example 3 | Example 4 |
| --- | --- | --- | --- | --- |
| Composition, parts by weight |  |  |  |  |
| Component (a) Hydrogenated block copolymer | (a-2)-1 100 | (a-2)-1 100 | (a-1)-4 100 | (a-1)-4 100 |
| Component (b) Propylene mixture | (b)-1 100 | (b)-1 50 | (b)-1 100 | (b)-1 50 |
| Component (c) Hydrocarbon oil | (c) — | (c) — | (c) 100 | (c) 50 |
| Physical properties |  |  |  |  |
| MFR (g/10 minutes) | 10 | 8 | 15 | 3 |
| Hardness (JIS A) | 88 | 87 | 42 | 55 |
| Tensile strength (kgf/cm$^2$) | 180 | 200 | 100 | 170 |
| Elongation (%) | 670 | 660 | 950 | 880 |
| Resilience (%) | 50 | 55 | 58 | 59 |
| Flaw resistance | 93 | 96 | 82 | 86 |
| Gloss retention (%) |  |  |  |  |
| Moldability | ○ | ○ | ○ | ○ |

TABLE 3

|  | Comp. Ex. 1 | Comp. Ex. 2 | Comp. Ex. 3 | Comp. Ex. 4 |
| --- | --- | --- | --- | --- |
| Composition, parts by weight |  |  |  |  |
| Component (a) Hydrogenated block copolymer | (a-2)-1 100 | (a-2)-1 100 | (a-1)-4 100 | (a-1)-4 100 |
| Component (b) | (b)-1 | (b)-1 | Santoprene 203-40 | (b)-1 |
| Propylene mixture | — | 950 | 100 | 100 |
| Component (c) Hydrocarbon oil | (c) — | (c) — | (c) — | (c) 330 |
| Physical properties |  |  |  |  |
| MFR (g/10 minutes) | 1.0 | 25 | 2 | 35 |
| Hardness (JIS A) | 70 | 97 | 84 | 40 |
| Tensile strength (kgf/cm$^2$) | 200 | 160 | 100 | 60 |
| Elongation (%) | 650 | 670 | 530 | 900 |
| Resilience (%) | 65 | 25 | 35 | 56 |
| Flaw resistance | 73 | 70 | 45 | 25 |
| Gloss retention (%) |  |  |  |  |
| Moldability | X | ○ | Δ | ○ |

EXAMPLES 5 TO 12

Using (a-1)-4 and (a-2)-2 as hydrogenated block copolymers, (b)-1 and (b)-3 as polypropylene mixtures, (c) as a hydrocarbon oil and (d)-1 as an olefin resin, these compounds in respective amounts shown in Tables 4 and 5 were blended using Henschel mixer and then melt-kneaded at 220° C. using an equi-directional twin screw extruder of 45 mm in diameter to obtain pellets of respective elastomer compositions. Next, these pellets of elastomer compositions were subjected to injection molding to obtain a plurality of air bag apparatus-housing covers for driver's seat use. These products were evaluated by the aforementioned test methods, with the results shown in Tables 4 and 5. As is evident from these results, the elastomer of the present invention is excellent in flaw resistance, strength and heat resistance, good in melt characteristics and excellent in injection moldability too. Also, its unfolding performance was good at all of the test temperatures −40° C., 23° C. and 90° C.

Shapes of the housing covers of Examples 5 to 12 are described below with reference to FIGS. 1 to 4. As shown in FIG. 1, the housing cover 1 has a flange 5 having a bolt hole 9 to be attached to a retainer (not shown), and is formed in the form of a box having a space 8 such that one side of the box can be opened and an air bag can be contained therein. A breakable portion 3 having a fragile structure is arranged on a top plate 2 in an H shape as shown by a dotted line in FIG. 1, and two hinge parts 4 are arranged on the top plate 2 as shown by one-dot-and-dash line in FIG. 1.

Figure 2:
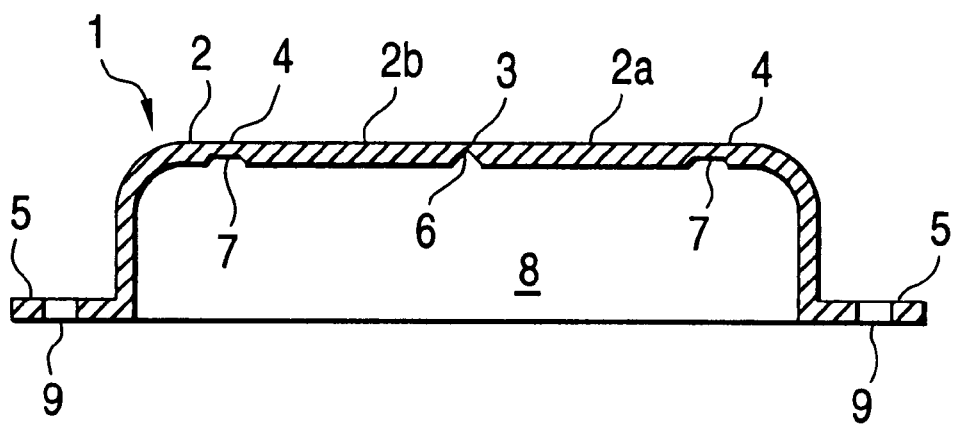
FIG. 2 is a sectional view of the housing cover taking along the II—II line shown in FIG. 1.
Figure 3:
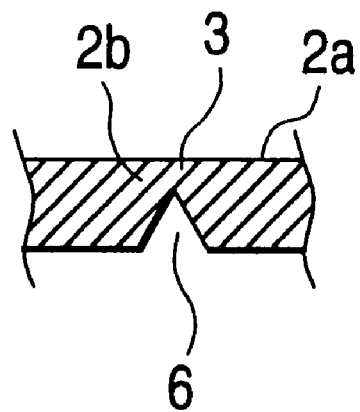
FIG. 3 is an enlarged sectional view of the V shape groove of the housing cover shown in FIG. 2.
Figure 4:
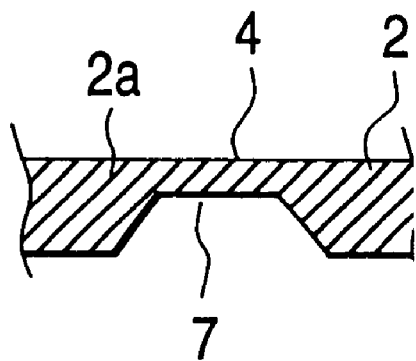
FIG. 4 is an enlarged sectional view of the U shape groove of the housing cover shown in FIG. 2.

The breakable portion 3 is formed by a groove 6 having a V-like sectional shape on the back side of the top plate 2 as shown in FIGS. 2 and 3, and the hinge parts 4 are formed by a groove 7 having a U-like sectional shape on the back side of the top plate 2 as shown in FIGS. 2 and 4. When an air bag (not shown) is inflated, the housing cover 1 breaks at the breakable portion 3 and two doors 2a and 2b are opened using the hinge parts 4 as the axis to release the air bag.

With regard to the size of the breakable portion 3, the parts corresponding to the two bars of the letter "H" are 120 mm and the part corresponding to the crossbar is 150 mm, and the breakable portion has a thickness of 0.5 mm, the hinge parts have a thickness of 2.5 mm and other portions have a thickness of 5 mm.

TABLE 4

|  | Example 5 | Example 6 | Example 7 | Example 8 |
|---|---|---|---|---|
| Composition, parts by weight |  |  |  |  |
| Component (a-1) Hydrogenated block copolymer | (a-1)-4 40 | (a-1)-4 40 | (a-1)-4 20 | (a-1)-4 60 |
| Component (a-2) Hydrogenated block copolymer | (a-2)-2 60 | (a-2)-2 60 | (a-2)-2 80 | (a-2)-2 40 |
| Component (b) Propylene mixture | (b)-1 60 | (b)-1 60 | (b)-1 60 | (b)-1 60 |
| Component (c) Hydrocarbon oil | (c) 40 | (c) 25 | (c) 40 | (c) 40 |
| Component (d) Polyolefin resin | (d)-1 85 | (d)-1 95 | (d)-1 85 | (d)-1 85 |
| Physical properties |  |  |  |  |
| MFR (g/10 minutes) | 6.5 | 6.0 | 9.5 | 3.5 |
| Hardness (JIS A) | 92 | 95 | 93 | 93 |
| Tensile strength (kgf/cm²) | 100 | 110 | 85 | 150 |
| Elongation (%) | 760 | 770 | 600 | 800 |
| Heat sag | 15 | 12 | 20 | 10 |
| Flaw resistance | 84 | 93 | 88 | 93 |
| Gloss retention (%) |  |  |  |  |
| De-embossing test | ◯ | ◯ | ◯ | ◯ |
| Moldability | ◯ | ◯ | ◯ | ◯ |
| Unfolding performance of cover |  |  |  |  |
| −40° C. | good | good | good | good |
| 23° C. | good | good | good | good |
| 90° C. | good | good | good | good |

TABLE 5

|  | Example 9 | Example 10 | Example 11 | Example 12 |
|---|---|---|---|---|
| Composition, parts by weight |  |  |  |  |
| Component (a-1) Hydrogenated block copolymer | (a-1)-4 40 | (a-1)-4 40 | (a-1)-4 40 | (a-1)-4 40 |
| Component (a-2) Hydrogenated block copolymer | (a-2)-2 60 | (a-2)-2 60 | (a-2)-2 60 | (a-2)-2 60 |
| Component (b) Propylene mixture | (b)-1 90 | (b)-1 20 | (b)-1 60 | (b)-1 60 |
| Component (c) Hydrocarbon oil | (c) 40 | (c) 40 | (c) 60 | (c) 20 |
| Component (d) Polyolefin resin | (d)-1 85 | (d)-1 85 | (d)-1 85 | (d)-1 85 |
| Physical properties |  |  |  |  |
| MFR (g/10 minutes) | 12.0 | 3.0 | 9.5 | 2.0 |
| Hardness (JIS A) | 93 | 91 | 80 | 97 |
| Tensile strength (kgf/cm²) | 110 | 95 | 85 | 150 |
| Elongation (%) | 750 | 770 | 850 | 700 |
| Heat sag | 23 | 10 | 26 | 9 |
| Flaw resistance | 90 | 83 | 81 | 95 |
| Gloss retention (%) |  |  |  |  |
| De-embossing test | ◯ | ◯ | ◯ | ◯ |
| Moldability | ◯ | ◯ | ◯ | ◯ |
| Unfolding performance of cover |  |  |  |  |
| −40° C. | good | good | good | good |
| 23° C. | good | good | good | good |
| 90° C. | good | good | good | good |

Reference Examples 1 To 4

Using (a-1)-4 and (a-2)-2 as hydrogenated block copolymers, (b)-1 as a polypropylene mixture, (c) as a hydrocarbon oil and (d)-1 as a polyolefin resin in respective amounts shown in Table 6, they were melt-kneaded and evaluated in the same manner as described in Examples 5 to 12. The results are shown in Table 6. It is evident from these results that the compositions having the range of Table 6 are poor in unfolding performance when made into air bag-housing covers.

TABLE 6

|  | Ref. Ex. 1 | Ref. Ex. 2 | Ref. Ex. 3 | Ref. Ex. 4 |
|---|---|---|---|---|
| Composition, parts by weight |  |  |  |  |
| Component (a-1) Hydrogenated block copolymer | (a-1)-4 75 | (a-1)-4 5 | (a-1)-4 40 | (a-1)-4 40 |
| Component (a-2) Hydrogenated block copolymer | (a-2)-2 25 | (a-2)-2 95 | (a-2)-2 60 | (a-2)-2 60 |
| Component (b) Propylene mixture | (b)-1 60 | (b)-1 60 | (b)-1 60 | (b)-1 60 |
| Component (c) Hydrocarbon oil | (c) 40 | (c) 40 | (c) 40 | (c) 120 |
| Component (d) Polyolefin resin | (d)-1 85 | (d)-1 85 | (d)-1 85 | (d)-1 85 |
| Physical properties |  |  |  |  |
| MFR (g/10 minutes) | 1.5 | 15.0 | 13.0 | 25 |
| Hardness (JIS A) | 93 | 93 | 93 | 65 |
| Tensile strength (kgf/cm²) | 120 | 75 | 125 | 85 |
| Elongation (%) | 800 | 770 | 760 | 950 |
| Heat sag | 8 | 30 | 15 | 29 |
| Flaw resistance | 90 | 88 | 90 | 80 |

TABLE 6-continued

|  | Ref. Ex. 1 | Ref. Ex. 2 | Ref. Ex. 3 | Ref. Ex. 4 |
|---|---|---|---|---|
| Gloss retention (%) |  |  |  |  |
| De-embossing test | ◯ | ◯ | ◯ | ◯ |
| Moldability | ◯ | ◯ | ◯ | ◯ |
| Unfolding performance of cover |  |  |  |  |
| −40° C. | bad | good | bad | good |
| 23° C. | good | good | good | good |
| 90° C. | good | bad | good | bad |

EXAMPLES 13 TO 19

Using (a-1)-1, (a-1)-2, (a-1)-3, (a-1)-4, (a-2)-1, (a-2)-2 and (a-2)-3 as hydrogenated block copolymers, (b)-2, (b)-3 and (b)-4 as polypropylene mixtures, (c) as a hydrocarbon oil and (d)-1 and (d)-2 as olefin resins, these compounds in respective amounts shown in Tables 7 and 8 were kneaded and evaluated in the same manner as described in Examples 5 to 12. The results are shown in Tables 7 and 8. As is evident from these results, the elastomer of the present invention is excellent in flaw resistance, strength and heat resistance, good in melt characteristics and excellent in injection moldabiity too. Also, its unfolding performance was good at all of the test temperatures −40° C., 23° C. and 90° C.

TABLE 7

|  | Example 13 | Example 14 | Example 15 | Example 16 |
|---|---|---|---|---|
| Composition, parts by weight |  |  |  |  |
| Component (a-1) Hydrogenated block copolymer | (a-1)-2 40 | (a-1)-3 40 | (a-1)-4 40 | (a-1)-1 40 |
| Component (a-2) Hydrogenated block copolymer | (a-2)-2 60 | (a-2)-3 60 | (a-2)-1 60 | (a-2)-1 60 |
| Component (b) Propylene mixture | (b)-3 60 | (b)-3 60 | (b)-3 60 | (b)-2 60 |
| Component (c) Hydrocarbon oil | (c) 40 | (c) 40 | (c) 40 | (c) 40 |
| Component (d) Polyolefin resin | (d)-1 85 | (d)-1 85 | (d)-1 85 | (d)-1 85 |
| Physical properties |  |  |  |  |
| MFR (g/10 minutes) | 6.0 | 4.5 | 8.5 | 3.5 |
| Hardness (JIS A) | 93 | 91 | 94 | 87 |
| Tensile strength (kgf/cm$^2$) | 110 | 95 | 100 | 120 |
| Elongation (%) | 730 | 770 | 720 | 800 |
| Heat sag | 15 | 20 | 15 | 20 |
| Flaw resistance | 77 | 83 | 88 | 90 |
| Gloss retention (%) |  |  |  |  |
| De-embossing test | ◯ | ◯ | ◯ | ◯ |
| Moldability | ◯ | ◯ | ◯ | ◯ |
| Unfolding performance of cover |  |  |  |  |
| −40° C. | good | good | good | good |
| 23° C. | good | good | good | good |
| 90° C. | good | good | good | good |

TABLE 8

|  | Example 17 | Example 18 | Example 19 |
|---|---|---|---|
| Composition, parts by weight |  |  |  |
| Component (a-1) Hydrogenated block copolymer | (a-1)-1 40 | (a-1)-2 40 | (a-1)-2 40 |
| Component (a-2) Hydrogenated block copolymer | (a-2)-2 60 | (a-2)-2 60 | (a-2)-2 60 |
| Component (b) Propylene mixture | (b)-3 60 | (b)-2 60 | (b)-4 60 |
| Component (c) Hydrocarbon oil | (c) 40 | (c) 40 | (c) 40 |
| Component (d) Polyolefin resin | (d)-2 85 | (d)-2 70 | (d)-2 70 |
| Physical properties |  |  |  |
| MFR (g/10 minutes) | 8.5 | 6.0 | 6.5 |
| Hardness (JIS A) | 96 | 85 | 86 |
| Tensile strength (kgf/cm$^2$) | 120 | 115 | 113 |
| Elongation (%) | 730 | 770 | 770 |
| Heat sag | 11 | 14 | 15 |
| Flaw resistance | 89 | 79 | 78 |
| Gloss retention (%) |  |  |  |
| De-embossing test | ◯ | ◯ | ◯ |
| Moldability | ◯ | ◯ | ◯ |
| Unfolding performance of cover |  |  |  |
| −40° C. | good | good | good |
| 23° C. | good | good | good |
| 90° C. | good | good | good |

Comparative Examples 5 To 10

Using (a-1)-1, (a-1)-5, (a-2)-1, (a-2)-4 and (a-2)-5 as hydrogenated block copolymers, (b)-1 and (b)-4 as polypropylene mixtures, (c) as a hydrocarbon oil and (d)-1 as an olefin resin in respective amounts shown in Tables 9 and 10, they were kneaded and evaluated in the same manner as described in Examples 5 to 12. As shown in Tables 9 and 10, compounds outside the range of the present invention are poor in certain physical properties or unfolding performance.

TABLE 9

|  | Comp. Ex. 5 | Comp. Ex. 6 | Comp. Ex. 7 |
|---|---|---|---|
| Composition, parts by weight |  |  |  |
| Component (a-1) Hydrogenated block copolymer | (a-1)-1 40 | (a-1)-1 40 | (a-1)-5 40 |
| Component (a-2) Hydrogenated block copolymer | (a-2)-1 60 | (a-2)-1 60 | (a-2)-1 60 |
| Component (b) Propylene mixture | (b)-1 — | (b)-1 60 | (b)-1 60 |
| Component (c) Hydrocarbon oil | (c) 40 | (c) 40 | (c) 40 |
| Component (d) Polyolefin resin | (d)-1 85 | (d)-1 170 | (d)-1 85 |
| Physical properties |  |  |  |
| MFR (g/10 minutes) | 0.8 | 14.0 | 1.5 |
| Hardness (JIS A) | 91 | 98 | 95 |
| Tensile strength (kgf/cm$^2$) | 110 | 160 | 130 |
| Elongation (%) | 770 | 550 | 650 |
| Heat sag | 9 | 5 | 8 |
| Flaw resistance | 70 | 65 | 67 |
| Gloss retention (%) |  |  |  |
| De-embossing test | ◯ | ◯ | ◯ |
| Moldability | X | ◯ | X |

TABLE 9-continued

|  | Comp. Ex. 5 | Comp. Ex. 6 | Comp. Ex. 7 |
|---|---|---|---|
| Unfolding performance of cover | | | |
| −40° C. | good | bad | bad |
| 23° C. | good | good | good |
| 90° C. | good | good | good |

TABLE 10

|  | Comp. Ex. 8 | Comp. Ex. 9 | Comp. Ex. 10 |
|---|---|---|---|
| Composition, parts by weight | | | |
| Component (a-1) | (a-1)-1 | (a-1)-1 | (a-1)-4 |
| Hydrogenated block copolymer | 40 | 40 | 40 |
| Component (a-2) | (a-2)-4 | (a-2)-5 | (a-2)-2 |
| Hydrogenated block copolymer | 60 | 60 | 60 |
| Component (b) | (b)-1 | (b)-1 | (b)-4 |
| Propylene mixture | 60 | 60 | 60 |
| Component (c) | (c) | (c) | (c) |
| Hydrocarbon oil | 40 | 40 | 40 |
| Component (d) | (d)-1 | (d)-1 | (d)-1 |
| Polyolefin resin | 85 | 85 | 85 |
| Physical properties | | | |
| MFR (g/10 minutes) | 18.0 | 5.5 | 1.5 |
| Hardness (JIS A) | 92 | 95 | 93 |
| Tensile strength (kgf/cm$^2$) | 60 | 125 | 110 |
| Elongation (%) | 550 | 700 | 740 |
| Heat sag | 50 | 10 | 13 |
| Flaw resistance | 55 | 70 | 73 |
| Gloss retention (%) | | | |
| De-embossing test | X | ◯ | ◯ |
| Moldability | ◯ | X | X |
| Unfolding performance of cover | | | |
| −40° C. | bad | bad | good |
| 23° C. | good | good | good |
| 90° C. | bad | good | good |

Since the elastomer composition obtained by the present invention has excellent flaw resistance, strength, heat resistance, flexibility and moldability, it can be used suitably in the field of automobile parts, domestic electrical components, toys, sundry goods and the like, particularly, because of its excellent flaw resistance, it can be applied suitably to interior panel, arm rest, handle, horn pad and the like automobile interior parts and weatherstrip, bumper and the like automobile exterior parts, which require good product appearance. Also, the air bag apparatus-housing cover obtained from the elastomer composition of the present invention can provide excellent air bag-unfolding performance within a broad temperature range of from −40° C. to 90° C. without generating cracking except for its breaking part or causing scattering of the cover. In addition, since it shows excellent flaw resistance on the surface of molded products and has excellent moldability, generally required painting process can be omitted so that high productivity and low cost can be realized.

While the invention has been described in detail and with reference to specific examples thereof, it will be apparent to one skilled in the art that various changes and modifications can be made therein without departing from the spirit and scope thereof.

What is claimed is:

1. A housing cover of air bag apparatus which comprises an elastomer composition which comprises:

(a) 100 parts by weight of a hydrogenated block copolymer prepared by hydrogenating a block copolymer that comprises:
  a polymer block A mainly comprising at least one vinyl aromatic compound; and
  a polymer block B mainly comprising at least one conjugate diene,
and has a number average molecular weight of from 30,000 to 400,000 and a content of the polymer block A of from 10 to 50% by weight based on the weight of said block copolymer;

(b) 5 to 900 parts by weight of a polypropylene mixture comprising:
  (b-1) 10 to 60% by weight of a polypropylene polymer having a propylene content of 85% by weight or more; and
  (b-2) 40 to 90% by weight of an ethylene-propylene copolymer rubber having a propylene content of 75% by weight or more,
wherein the ethylene-propylene copolymer rubber in said mixture has an average dispersed particle size of not more than 2 μm and said mixture has a bending modulus of from 20 to 700 Mpa, a Shore D hardness of from 20 to 60 and a melt flow rate of from 10 to 60 g/10 minutes; and (c) 0 to 200 parts by weight of a hydrocarbon oil.

2. A housing cover of air bag apparatus which comprises an elastomer composition which comprises:

(a) 100 parts by weight of a mixture of the following hydrogenated block copolymers (a-1) and (a-2):
  (a-1) 10 to 70 parts by weight of a hydrogenated block copolymer prepared by hydrogenating a block copolymer that comprises:
    a polymer block A' mainly comprising at least two vinyl aromatic compound; and
    a polymer block B mainly comprising at least one conjugate diene,
  and has a number average molecular weight of from 150,000 to 400,000 and a content of the polymer block A' of from 15 to 50% by weight based on the weight of said block copolymer; and (a-2) 30 to 90 parts by weight of a hydrogenated block copolymer prepared by hydrogenating a block copolymer that comprises:
    a polymer block A mainly comprising at least one vinyl aromatic compound; and
    a polymer block B mainly comprising at least one conjugate diene,
  and has a number average molecular weight of from 30,000 to 140,000 and a content of the polymer block A of from 10 to 50% by weight based on the weight of the copolymer;

(b) 5 to 900 parts by weight of a polypropylene mixture comprising:
  (b-1) 10 to 60% by weight of a polypropylene polymer having a propylene content of 85% by weight or more; and
  (b-2) 40 to 90% parts by weight of an ethylene-propylene copolymer rubber having a propylene content of 75% by weight or more, wherein 70% by weight or more of the ethylene-propylene copolymer rubber in said mixture has an average dispersed particle size of 2 μm or less and said mixture has a bending modulus of from 20 to 700 Mpa, a Shore D hardness of from 20 to 60 and a melt flow rate of from 10 to 60 g/10 minutes, (c) 0 to 200 parts by weight of a hydrocarbon oil; and (d) 20 to 150 parts by weight of a polyolefin resin having a melt flow rate of from 5 to 100 g/10 minutes.

3. The housing cover of air bag apparatus according to claim 1, wherein the polypropylene composition (b) has a melt flow rate of from 12 to 60 g/10 minutes.

4. The housing cover of air bag apparatus according to claim 2, wherein the polypropylene composition (b) has a melt flow rate of from 12 to 60 g/10 minutes.

5. The housing cover of air bag apparatus according to claim 1, wherein the polypropylene composition (b) is a mixture prepared by a successive polymerization having at least two steps which comprise:

a first step of preparing a propylene homopolymer, a propylene-α-olefin copolymer having a propylene content of not less than 85% by weight, or an ethylene-propylene copolymer having a propylene content of not less than 85% by weight; and a second step of preparing an ethylene-propylene or ethylene-propylene-α-olefin copolymer optionally containing a small amount of diene.

6. The housing cover of air bag apparatus according to claim 2, wherein the polypropylene composition (b) is a mixture prepared by a successive polymerization having at least two steps which comprise:

a first step of preparing a propylene homopolymer, a propylene-α-olefin copolymer having a propylene content of not less than 85% by weight, or an ethylene-propylene copolymer having a propylene content of not less than 85% by weight; and a second step of preparing an ethylene-propylene or ethylene-propylene-α-olefin copolymer optionally containing a small amount of diene.

7. The housing cover of air bag apparatus according to claim 1, wherein the vinyl aromatic compound is styrene and the conjugate diene compound is butadiene, isoprene or a combination thereof.

8. The housing cover of air bag apparatus according to claim 2, wherein the vinyl aromatic compound is styrene and the conjugate diene compound is butadiene, isoprene or a combination thereof.

9. The housing cover of air bag apparatus according to claim 1, wherein the hydrocarbon oil is a non-aromatic mineral oil.

10. The housing cover of air bag apparatus according to claim 2, wherein the hydrocarbon oil is a non-aromatic mineral oil.

11. The housing cover of air bag apparatus according to claim 1, wherein the amount of the hydrocarbon oil is 10 to 100 parts by weight.

12. The housing cover of air bag apparatus according to claim 2, wherein the amount of the hydrocarbon oil is 10 to 100 parts of weight.

13. The housing cover of air bag apparatus according to claim 2, wherein the polyolefin resin comprises at least one of a propylene homopolymer and a copolymer of propylene with an α-olefin having from 2 to 8 carbon atoms.

* * * * *